March 30, 1943.  F. A. QUIROZ  2,315,011

INTERNAL COMBUSTION ENGINE

Filed Nov. 12, 1940  4 Sheets-Sheet 1

INVENTOR.
FRANCISCO A. QUIROZ.

BY

HIS ATTORNEYS.

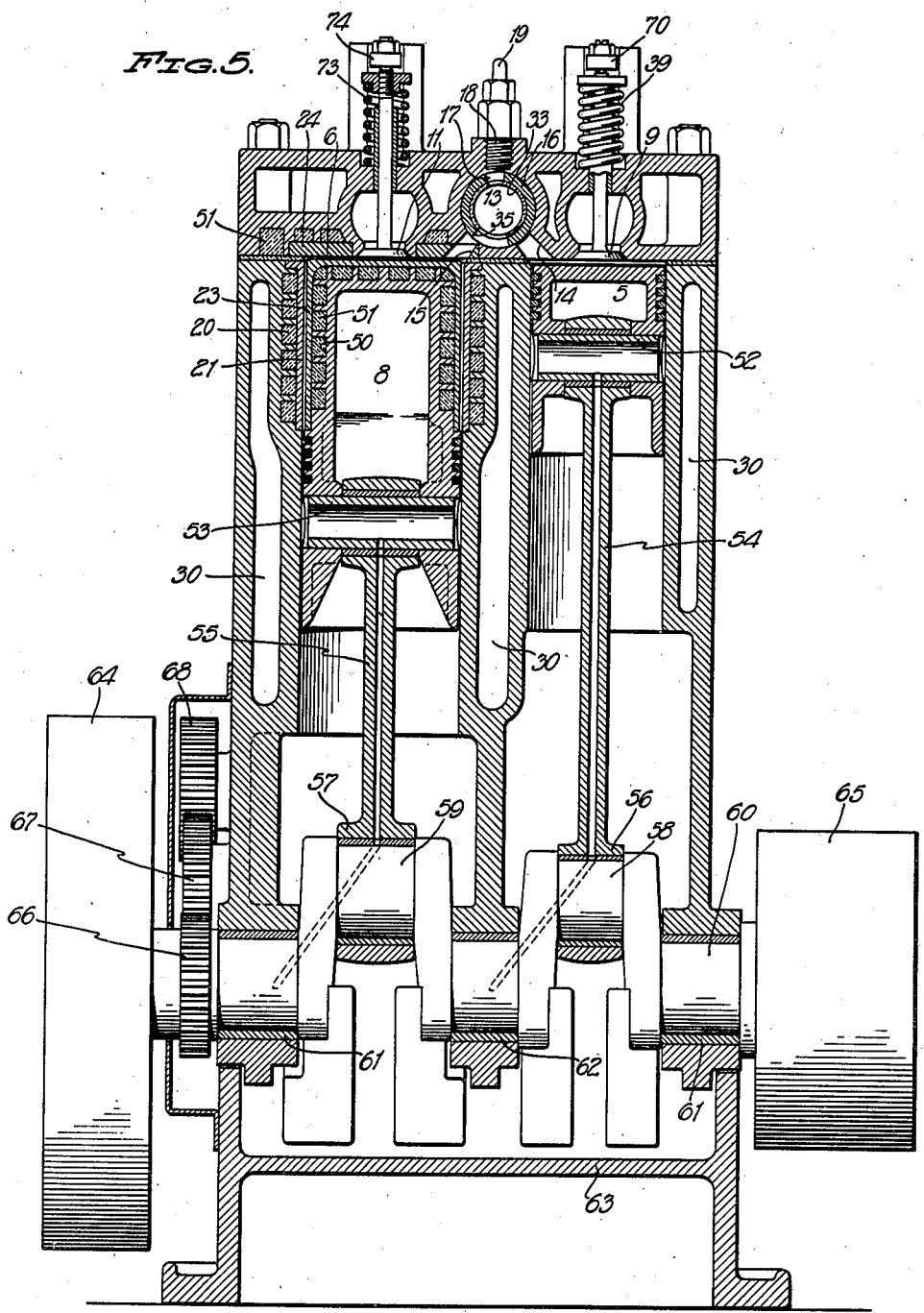

March 30, 1943.      F. A. QUIROZ      2,315,011
INTERNAL COMBUSTION ENGINE
Filed Nov. 12, 1940       4 Sheets-Sheet 3
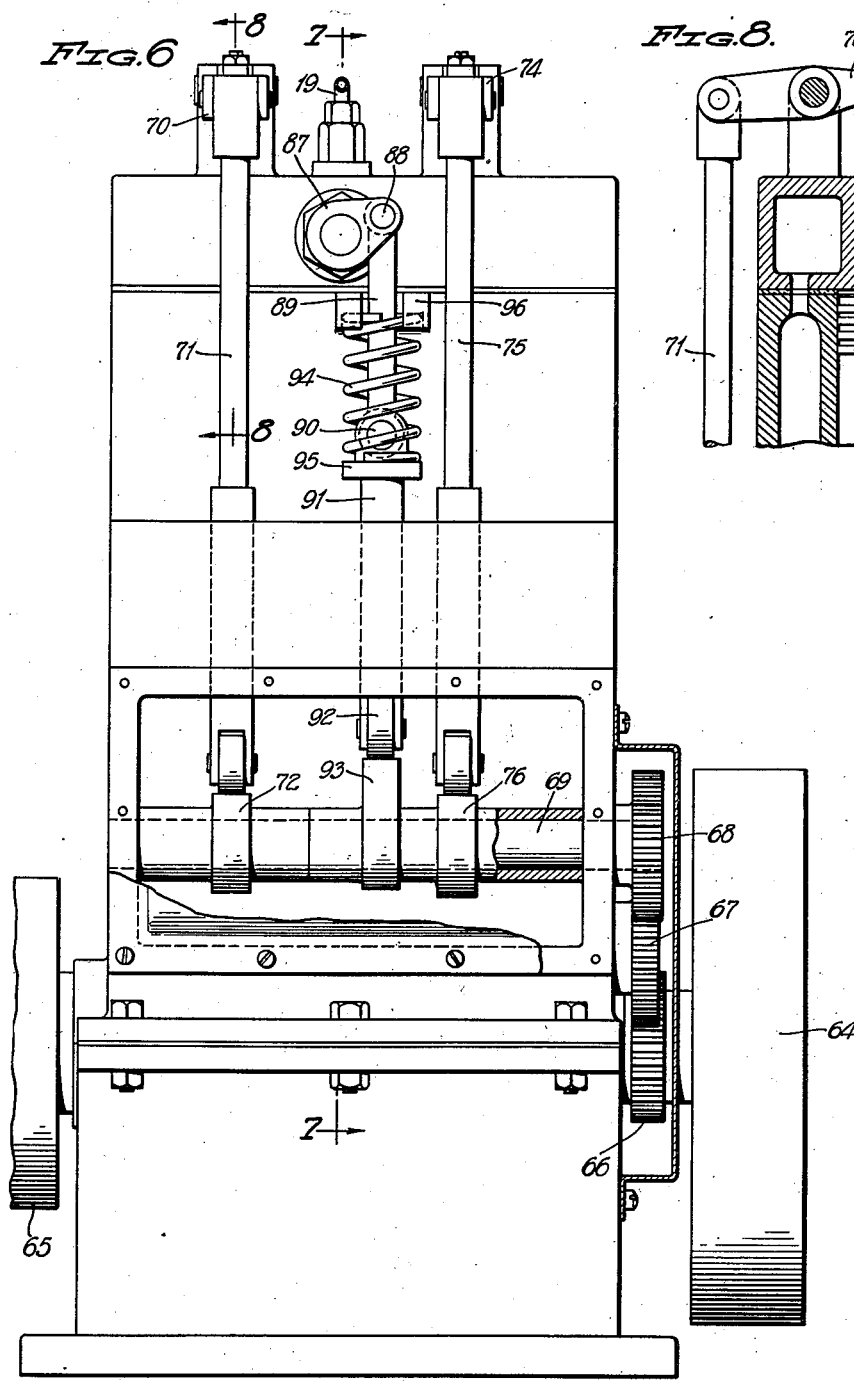
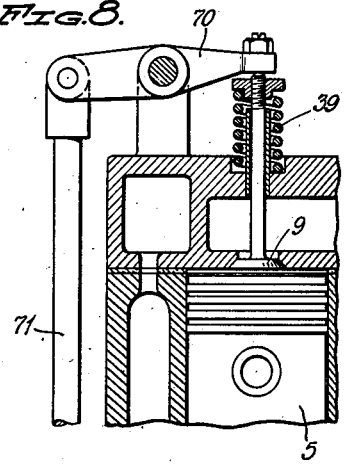
INVENTOR.
FRANCISCO A. QUIROZ.
BY
HIS ATTORNEYS March 30, 1943.  F. A. QUIROZ  2,315,011
INTERNAL COMBUSTION ENGINE
Filed Nov. 12, 1940  4 Sheets-Sheet 4
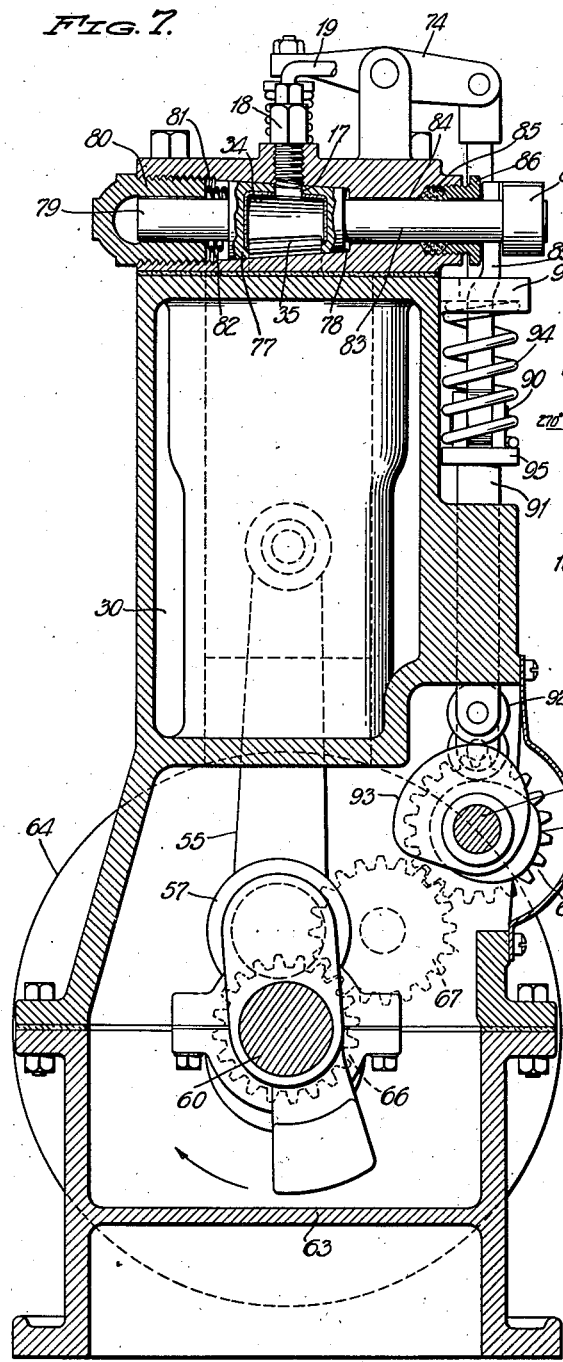
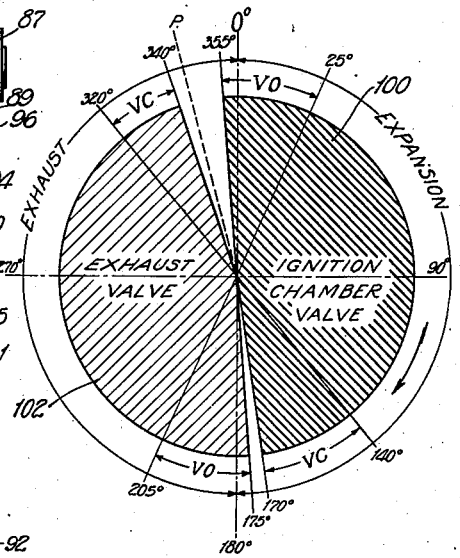
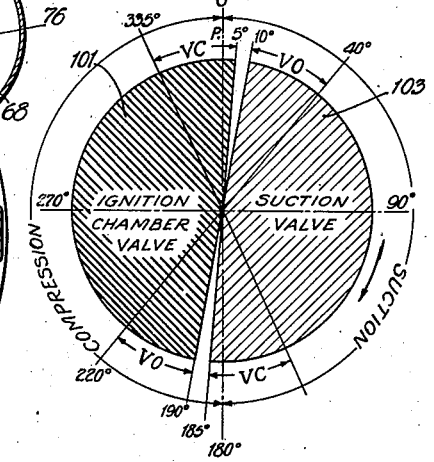
INVENTOR.
FRANCISCO A. QUIROZ.
BY
HIS ATTORNEYS.

Patented Mar. 30, 1943

2,315,011

UNITED STATES PATENT OFFICE 2,315,011

INTERNAL COMBUSTION ENGINE

Francisco Angel Quiroz, Newark, N. J.

Application November 12, 1940, Serial No. 365,189

4 Claims. (Cl. 123—68)

This invention relates to internal combustion engines, and its main object is to provide an engine having a considerably higher thermal efficiency than the present Diesel or Otto cycle engines.

In the operation of an internal combustion engine, a large portion of the energy in the fuel is absorbed as heat by the cooling system of the engine, directly from the combustion gases; another large portion passes off in the exhaust gases, partly in the form of sensible heat and partly as work against the atmosphere. Most of the remainder is converted into work on the piston; but a considerable part of this work energy is converted into heat by friction in the engine and thus lost. Only a minor part of the fuel energy is converted into useful work. A primary object of my invention is to convert a greater proportion of the fuel energy into useful work, and to reduce the loss of heat energy by heat transfer from the combustion gases to the cooling system and by discharge with the exhaust gases into the atmosphere.

The achievement of this object by my invention is the result of a combination of construction and operating factors which, as compared with the present normal practice, increase the mass of air or gas mixture taken in on the suction stroke, without the use of a supercharger; bring the compression stroke nearer to an isothermal operation and the expansion stroke nearer to an adiabatic operation; and expand the gases in the expansion stroke to a lower pressure and temperature.

The combination of factors which produces these results is realized primarily by segregating the two operations, compression and expansion, now usually performed in the same cylinder, and carrying them out in two separate chambers, each designed for its particular function.

The invention is applicable to engines operating on a carbureted mixture as well as to fuel injection-type engines.

One of the objects of the invention is to prevent the immediate elevation of the temperature of the charge sucked into a cylinder, by its contact with a remnant of hot gases and the highly heated walls of a combustion chamber, the effect of such a rise of temperature being to lower the density of the charge and thus to reduce the mass of the gaseous charge which can enter the cylinder on the suction stroke.

Another object, particularly when operating with a carbureted mixture, is to absorb a greater portion of the heat of compression from the charge, during the compression stroke, in order that the denser charge sucked in may be compressed to a pressure higher than that which is normal for the Otto cycle engine, without reaching the ignition temperature, thereby increasing the efficiency of the engine.

Another object of the invention is to avoid subjecting the expanding combustion gases to the usual loss of heat into the cooling water, and thus to save a greater proportion of their energy for useful work.

Still another object of the invention is to convert into useful work as much as possible of the energy which has heretofore passed out with the exhaust gases, by allowing the combustion gases to expand against the work piston as close as possible to atmospheric pressure.

A further object is to provide an expansion chamber formed by a cylinder and piston so constructed that the walls of the expansion chamber with which the combustion gases come in contact are kept at a high temperature, while the bearing walls of the piston and cylinder are kept relatively cool and protected from the hot gases.

Another object is to provide an engine with greater power per unit of weight.

The invention will be described in detail by reference to certain illustrative embodiments shown in the drawings, wherein—

Fig. 5 is a vertical section of an engine as shown in Figs. 1 to 3, illustrating details of construction.

Fig. 6 is a side elevation of the engine shown in Fig. 5, from the opposite side, with parts of the casing broken away.

Fig. 7 is a vertical section on the line 7—7 of Fig. 6.

Fig. 8 is a detail vertical section on the line 8—8 of Fig. 6, showing a suction valve.

Figs. 9 and 10 are diagrams of the valve operations, in relation to the movements of the cranks connected to the expansion piston and the compression piston, respectively.

Figure 1:
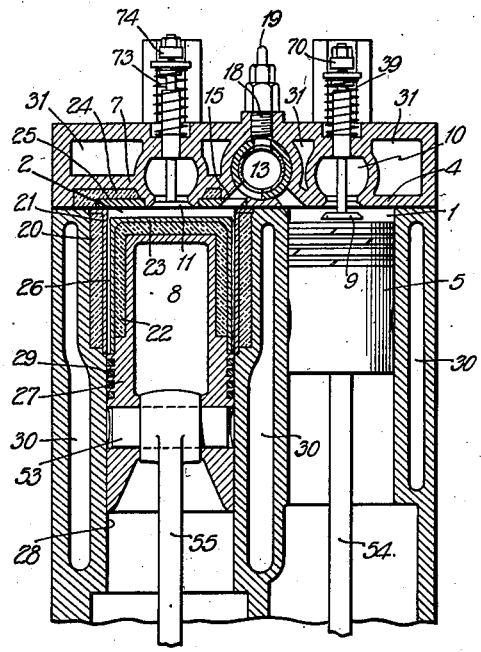
Figs. 1, 2 and 3 are vertical sections, in somewhat diagrammatical form, of an injection-type engine in accordance with my invention, showing the pistons in three different stages of their operation.
Figure 2:
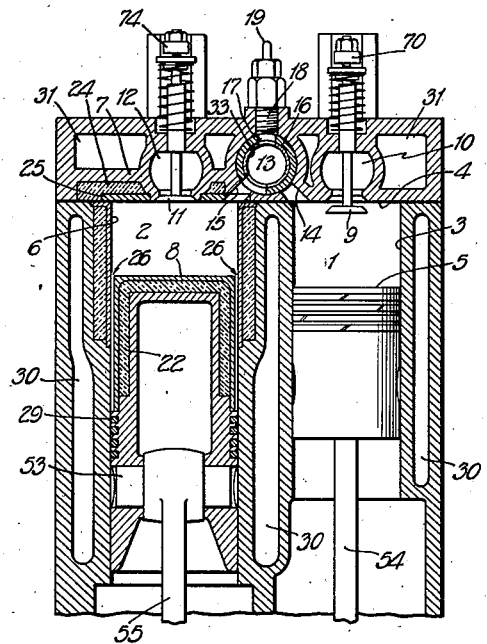
Figure 3:
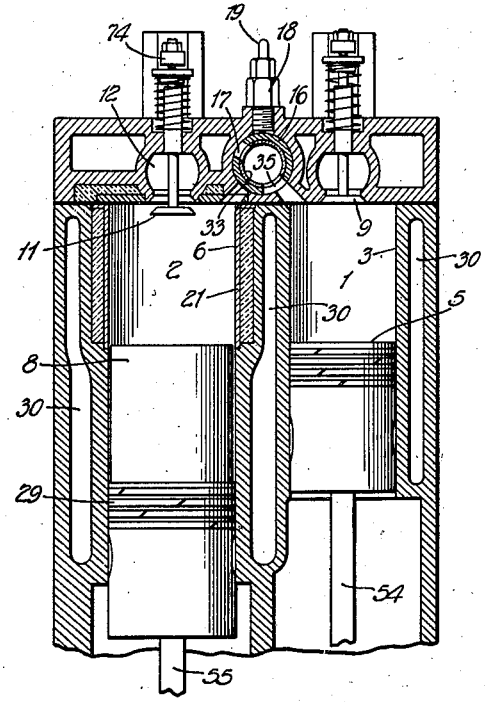

Referring first to Figs. 1 to 3, the engine there shown comprises a suction chamber 1 and an expansion chamber 2. The suction chamber is formed by a cylinder 3 having a cylinder head 4 and a piston 5. The expansion chamber 2 is formed by a cylinder 6 having a head 7 and a piston 8. In the head 4 is a suction valve 9 for controlling the admission of air from an intake channel 10 into the suction chamber 1. In the head 7 is an exhaust valve 11 to control the escape of the spent gases into an exhaust conduit 12. Between the compression chamber 1 and the expansion chamber 2 is an ignition chamber 13, which can be brought into communication with the compression chamber 1 through a channel 14 and with the expansion chamber 2 through a channel 15. The communication of the ignition chamber with the compression and expansion chambers is controlled by an oscillating valve 16 which, in this case, is hollow, and the cavity of which constitutes the ignition chamber. A port 35 connects the chamber 13 with either the channel 14 or the channel 15, according to the position of the valve. The valve 16 has at the side opposite the port 35 a port 17 for admission of fuel charges from an injection nozzle 18 supplied through a pipe 19. The cylinders are cooled by water held in the water jacket space 30, while the heads 4, 7, which are actually in a single casting, are cooled by water held in the water jacket space 31. The ignition chamber 13 is preferably lined with a layer of heat-insulating material 33.

The operation of the machine, as thus far described, will now be explained by reference to the three positions shown in Figs. 1, 2 and 3.

Fig. 1 shows the compression piston 5 and the expansion piston 8 starting downward on their suction and expansion strokes, respectively. The compression piston 5 is leading the expansion piston 8 by a small amount, preferably about 15° on the crank circle. The suction valve 9 is open and air is being drawn into the compression chamber 1 from the suction conduit 10. The oscillating valve 16 is in the position in which the ignition chamber 13 is in communication with the expansion chamber 2. A charge of air compressed into the ignition chamber on the previous stroke, and heated by the combustion of a charge of fuel injected through the nozzle 18, is expanding in the expansion chamber. The charge of fuel was ignited by the high temperature of the compressed charge of air, in the manner familiar in Diesel engine operation.

Fig. 2 shows the pistons after they have progressed in their downward stroke approximately half way. The lead of the piston 5 over the piston 8 shows more clearly here, where the difference in crank angle gives rise to the maximum difference in the relative positions of the pistons.

Fig. 3 shows the pistons just after passing bottom dead center. The piston 5 has started up slightly in advance of the piston 8. The suction valve 9 has been closed. The oscillating valve 16 has been thrown to the position where the ignition chamber 13 is cut off from the expansion chamber 2 and is in communication with the compression chamber 1. As the piston 5 continues to move up, the air which was drawn into the compression chamber 1 is compressed into the ignition chamber 13. In the expansion chamber 2, meanwhile, the exhaust valve 11 has been opened and the spent gases are being forced out through the exhaust conduit 12. When the piston 5 reaches the upper limit of its movement, the closure of the exhaust valve 11 has already taken place and the oscillating valve 16 has swung back to the position shown in Fig. 1. The exact timing of the valves will be described in more detail presently. When the piston 8 reaches its upper dead center position, another charge of fuel is injected into the ignition chamber and the cycle is repeated.

In the operation of the engine following the cycle described, certain factors, now to be referred to, come into play to increase the efficiency of the operation. The air which is sucked into the compression chamber 1 from the suction conduit 10 enters a relatively cool cylinder, because there has been no previous explosion in it. Furthermore, there is no remnant of combustion gases in this cylinder. Consequently, the sudden rise in temperature of the charge of air entering the cylinder of a normal engine is avoided and, the air being more dense, a greater weight of air occupies the compression chamber at the end of the suction stroke. During a large part of the compression stroke which follows, the comparatively cool walls of the compression chamber constitute a preponderance of the surface area in contact with the charge, the area of the heated walls of the ignition chamber 13 being comparatively small; consequently the heat of compression is drawn off rapidly. Notwithstanding the greater weight of air in the compression chamber, the pressure exerted on the compression piston 5 during the compression stroke is not greater than in a normal Diesel engine. Thus the work of compression is no greater.

During the expansion stroke, the heat of the combustion gases is conserved by insulation interposed between the expansion chamber and the cooling water, and also in the walls of the piston. The preferred structure of this insulation will be described in detail later. In Figs. 1 to 3, there is shown a sleeve of insulation 20 in the wall of the cylinder 6, covered by a sleeve of metal 21. The piston is constructed similarly, with a cap of insulating material 22 and a metal cap 23. Also the cylinder head 7 comprises a layer of insulation 24 covered by a metal plate 25. The diameter of the upper insulated portion of the piston 8 is sufficiently smaller than the bore of the cylinder 6 to leave a narrow clearance space 26. The piston is guided by its lower portion 27 in the lower portion 28 of the cylinder wall. The portion 27 of the piston has piston rings 29 bearing against the cylinder wall. The mutual bearing surfaces of the cylinder and the piston with its rings are lubricated, while the surfaces of the insulated portions of the cylinder and piston are not lubricated and do not come in contact. The extent of the insulated portions of the cylinder and piston, parallel to their common axis, is approximately equal to the stroke of the piston. The dead space 26 protects the lubricant and the bearing walls of the cylinder and piston from the heat of the combustion gases.

The insulation of the piston and cylinder wall retards the flow of heat from the combustion gases into the cooling water, and the temperature of these insulated walls rises to and remains at a point much higher than that of a normal water-cooled cylinder. This reduces the flow of heat out of the combustion gases during the expansion stroke, and conserves their energy. In order to take advantage of the greater number of heat units in the combustion gases, and also the higher pressure, the expansion chamber 2 is designed to have a considerably greater volume at the lower dead center position of the expansion piston than the maximum volume of the compression chamber 1. This additional volume is required for the conversion of the increased available energy into work applied to the load piston 8. Furthermore, since the expansion chamber is a separate element from the compression chamber, the expansion chamber may be so proportioned as to permit the combustion gases to expand to a lower pressure and temperature than in the operation of a standard engine, thus extracting from them a portion of the energy heretofore lost in the exhaust gases.

The total effect of the factors described is to increase the proportion of the fuel energy converted into work upon the load piston. This result is due, on the one hand, to the higher initial pressure and temperature at the start of the expansion stroke, and on the other hand to the continuation of the conversion of the heat energy of the gases into work upon the load piston beyond the point of pressure and temperature where they are customarily released into the exhaust pipe, or in other words the lower final pressure and temperature at the completion of the expansion stroke.

Figure 4:
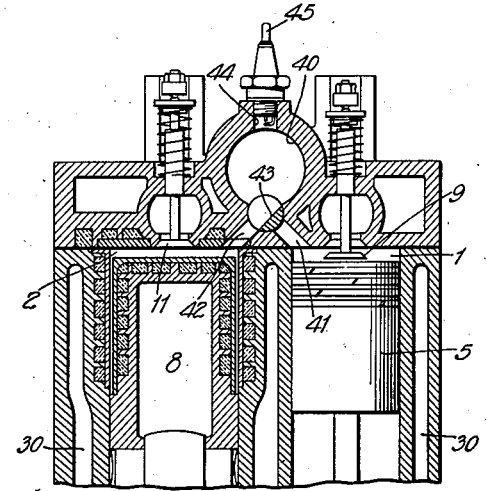
Fig. 4 is a similar vertical section of a modified form of engine, for operation with a carbureted mixture.

Fig. 4 shows a modification of the engine particularly suitable for operation with a carbureted mixture. The compression chamber 1 and expansion chamber 2 are substantially the same as before. The difference lies principally in the ignition chamber 40 which, in this case, is somewhat larger than before, because the compression cannot be carried to such a high point with a carbureted mixture. The ignition chamber 40 is connected to the compression and expansion chambers by channels 41 and 42, which branch out from a central point at which is located an oscillating valve 43. The valve can move from the position shown in the drawing, in which it closes the channel 41 and opens the channel 42, to a position in which it closes the channel 42 and opens the channel 41. At the top of the chamber 40 is a port 44 into which is screwed a spark plug 45.

The operation of the engine shown in Fig. 4 will be readily understood, without repeating in detail the previous description, which applies in general to this engine as well. The gas drawn in through the suction valve 9 is a mixture of air and volatile fuel. The mixture is compressed into the ignition chamber 40 by an upward stroke of the piston 5 following the suction stroke, the valve 43 being at this time in its position opposite to that shown in Fig. 4. Notwithstanding the greater weight of gas mixture drawn in on the suction stroke, and the higher compression I prefer to employ, the temperature of the gas mixture compressed into the ignition chamber is moderated by the low temperature at which the compression begins and by the rapid withdrawal of the heat of compression. There is thus eventually compressed into the ignition chamber 40 a gas mixture at higher compression and of greater weight per unit volume than in a standard engine, without the temperature of the mixture being raised to the ignition point during the compression stroke.

On the expansion stroke the operation is similar to that previously described, insofar as the conservation of heat in the combustion gases and the expansion of them to a relatively low temperature and pressure are concerned. The channel 42 exerts a control over the expanding gases, preventing a too sudden pressure impact upon the piston 3 and making the engine adaptable for operation with gasoline of lower octane rating than that which can be used in a standard engine of similar compression.

Figs. 5 to 8 show some of the preferred details of construction of an engine embodying my invention. In the expansion chamber 6, the walls are insulated, as previously stated. The preferred insulating structure is one adapted for the utilization of the highly efficient porous type of insulation, such as asbestos. The walls of the piston, cylinder and cylinder head are constructed with grooves 50 to receive a packing of porous insulating material 51. The cylinder wall is faced with a sleeve 21, which is preferably composed of a heat-resistant metal alloy. The cap 23, forming a facing for the piston, and the disk 24, providing a facing for the cylinder head, are preferably of the same material as the sleeve 21. The heat-resistant metal alloy is preferably one which takes a high polish, to reduce the loss of heat into the engine walls by radiation as far as possible.

The pistons are connected by wrist pins 52 and 53 to connecting rods 54 and 55, at the lower ends of which are bearings 56 and 57 in which are journalled cranks 58 and 59 of a crank shaft 60. The crank shaft is mounted in main bearings 61, 62 of a crank case 63 and carries a flywheel 64 and a load member 65. The crank 58 leads the crank 59 by a small angle, for instance 15°. Timing gears 66, 67, 68 operate a cam shaft 69 controlling the valves. The suction valve 9 is under the influence of a valve spring 39 and is operated by a valve rocker 70 actuated through a rod 71 by a cam 72 fixed upon the shaft 69. The exhaust valve 11 is under the influence of a valve spring 73 and is operated by a valve rocker 74 actuated through a rod 75 by a cam 76 fixed upon the shaft 69.

The oscillating valve 16 comprises a conical valve member 77 received in a conical bore 78. At its left end (Fig. 7), the valve member 77 has a shaft 79 extending into a closed bushing 80 screwed into a threaded hole 81 in the cylinder head. Between the bushing 80 and the valve member 77 is a spring 82 which presses the valve member 77 axially against the wall of the conical bore 78, preserving a tight joint. At its right end (Fig. 7), the valve member 77 has a shaft 83 which extends to the outside through a bore 84 in the cylinder head stopped by a stuffing box comprising a packing ring 85 and a bushing 86. To the outer end of the shaft 83 is fixed an arm 87 articulated at 88 to the upper end of a valve-operating rod 89. The rod 89 is hinged at 90, and its lower end 91 carries a roller 92 resting upon a cam 93 fixed to shaft 69. A spring 94 is compressed between a flange 95 of the lower end 91 of rod 89 and a seat 96 formed by a lug on the cylinder block.

The timing of the valves is shown in the diagrams of Figs. 9 and 10. The more densely shaded areas 100 and 101 of the diagrams represent the portions of the crank circles of the cranks 59 and 58, respectively, during which the oscillating valve opens the channels into the respective chambers 1 and 2. The less densely shaded areas 102 and 103 represent the portions of the crank circles during which the exhaust valve and the suction valve, respectively, are open. The two diagrams should be considered as relatively displaced by 15°; that is to say, when the crank of the expansion piston 8 is at the point P in Fig. 9 (345°), the crank of the suction piston 5 is at the point P in Fig. 10 (0°).

It will be observed from these diagrams that the ignition chamber valve 13 begins to open the channel 15 into the expansion chamber 2 at 5° before top dead center position of the crank 59. At this time, the crank 58 is 10° past top dead center and the suction valve 9 is beginning to open. The channel 15 is completely opened by the valve 16 when the crank 59 has moved through 30° and has reached the point 25° past top dead center, as indicated by the letters VO. The suction valve has moved to full open position at the same time, the crank 58 being at this instant 40° past top dead center. The valves are held in this position while the crank 59 moves to the 140° mark, at which point the valve 16 starts its movement to close the channel 15. The closure is completed when the crank 59 reaches 170°, as indicated by the letters VC, but the valve continues its movement beyond this point. Meanwhile, at the 155° position of crank 58, namely at the same instant the valve 16 started its movement to close channel 15, the closure of the suction valve 9 begins. It is completed at 185°. At the 190° position of the crank 58, the valve 16 begins to open the channel 14. This occurs at 5° of crank movement after the valve 16 closed the channel 15. The channel 14 is completely opened by the valve 16 at the 220° point of crank 58. Meanwhile, the exhaust valve 11 began to open at the 175° point of crank 59, which was at the same instant when the valve 16 began to open the channel 14. The exhaust valve is fully opened when the crank 59 reaches the 205° point. It remains fully open until the crank 59 reaches the 320° point, at which instant the exhaust valve begins to close. At the same instant, the valve 16 starts to close the channel 14, the crank 58 being at the 335° point. The exhaust valve closes more rapidly than the other valve movements, being completely closed at the 340° point of crank 59, which is just 20° after its closure began. On the other hand, the oscillating valve 16 takes 30° of crank movement to close the channel 14, completing its closure at the 5° point of crank 58. The purpose of the early closure of the exhaust valve is to build up a low pressure in the expansion chamber to counterbalance the pressure in the ignition chamber at the close of the compression stroke of piston 5.

It will be seen from the above description that I have provided an internal combustion engine wherein a charge is compressed to a higher density and expanded, with a smaller loss of heat into the engine walls and cooling system by radiation and conduction, and wherein the increased energy thus made available for each cycle is converted into useful work by allowing the combustion gases to expand against the load piston to a volume considerably greater than that of the original charge before compression. By divorcing the size of the expansion chamber from that of the compression chamber, I have also made it possible to save a further portion of the fuel energy by carrying the expansion against the load piston down to a point nearer atmospheric pressure than is customary in internal combustion engines.

As compared with a normal internal combustion engine carrying out the compression and expansion in the same cylinder, whether of the Diesel or Otto cycle, the construction which I have described results in a saving of weight per unit of power, because of the higher efficiency obtained by transforming into useful work, energy which is now wasted in the cooling water and exhaust gases.

I claim:

1. In an internal combustion engine, a cylinder and piston forming a compression chamber, a cylinder and piston forming an expansion chamber having a greater maximum capacity than said compression chamber, a channel interconnecting said chambers comprising an ignition chamber, an intake valve in said compression chamber, an exhaust valve in said expansion chamber, valve means controlling said channel so as to close said ignition chamber from said expansion chamber while admitting a charge to said ignition chamber from said compression chamber during a compression stroke of the compressor piston thereof, and to close said ignition chamber from said compression chamber while releasing a charge from said ignition chamber into said expansion chamber during an expansion stroke of the piston thereof, means mechanically connecting said pistons so that an expansion stroke of said expansion chamber piston follows directly after a compression stroke of said compression chamber piston, means forming water jacket cavities around the walls of said compression chamber cylinder, said compression chamber piston being designed to provide good heat conduction from the entire surface of the head of said piston to the walls of said compression chamber cylinder, and the piston and cylinder walls of said expansion chamber comprising metallic surface parts constituting the boundaries of the expansion chamber, backed by insulation over a major part of their area.

2. An internal combustion engine as described in claim 1, wherein said valve means controlling said channel comprises a hollow oscillating valve member, the inner space of which constitutes said ignition chamber, said valve member being lined with heat-insulating material.

3. An internal combustion engine as described in claim 1, wherein said valve means controlling said channel comprises a hollow oscillating valve member, the inner space of which constitutes said ignition chamber, said valve member having an opening on the side opposite said compression and expansion chambers, and means for injecting fuel into said ignition chamber through said opening.

4. An internal combustion engine as described in claim 1, wherein said valve means controlling said channel comprises a hollow oscillating valve member, the inner space of which constitutes said ignition chamber, and means for operating said inlet and exhaust valves, the operating means for said exhaust valve being adapted to hold said exhaust valve open during the inward movement of the piston of said expansion chamber and to close said exhaust valve shortly before the end of said inward movement, in order to establish a balancing pressure within said expansion chamber before said balancing valve turns to open said ignition chamber to said expansion chamber.

FRANCISCO ANGEL QUIROZ.